United States Patent
Pepper et al.

(10) Patent No.: US 7,206,777 B2
(45) Date of Patent: Apr. 17, 2007

(54) METHOD AND SYSTEM FOR ARCHIVING AND RETRIEVING A MARKUP LANGUAGE DOCUMENT

(75) Inventors: Martin Pepper, Warwick (GB); Mark A. Stephens, Northglenn, CO (US)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 10/696,694

(22) Filed: Oct. 29, 2003

(65) Prior Publication Data
US 2005/0097513 A1    May 5, 2005

(51) Int. Cl.
*G06F 7/00* (2006.01)
(52) U.S. Cl. ............................................. 707/3; 707/5
(58) Field of Classification Search ............... 707/1–5, 707/200, 204, 205
See application file for complete search history.

(56) References Cited

U.S. PATENT DOCUMENTS

| | | | |
|---|---|---|---|
| 6,366,933 B1 | 4/2002 | Ball et al. | 715/511 |
| 6,366,934 B1 * | 4/2002 | Cheng et al. | 715/513 |
| 6,510,434 B1 * | 1/2003 | Anderson et al. | 707/100 |
| 6,578,056 B1 * | 6/2003 | Lamburt | 715/500.1 |
| 6,601,075 B1 * | 7/2003 | Huang et al. | 707/104.1 |
| 6,643,633 B2 * | 11/2003 | Chau et al. | 707/1 |
| 6,684,204 B1 * | 1/2004 | Lal | 707/3 |
| 6,862,588 B2 * | 3/2005 | Beged-Dov et al. | 707/3 |
| 6,947,991 B1 * | 9/2005 | Burton et al. | 709/227 |
| 7,020,667 B2 * | 3/2006 | Guest et al. | 707/204 |

FOREIGN PATENT DOCUMENTS

| GB | 2 387 453 A | 10/2003 |
|---|---|---|
| WO | WO 00/77668 A2 | 12/2000 |

* cited by examiner

*Primary Examiner*—Wilson Lee
(74) *Attorney, Agent, or Firm*—Norman L. Gundel; Hoffman, Warnick D'Alessandro LLC

(57) ABSTRACT

A method, system, and program product for the archiving of a markup language document. The method includes the steps of: identifying at least one referenced resource in the document; determining if the at least one identified referenced resource is stored in a storage device; and in response to an unsuccessful determining step, storing the at least one identified referenced resource in the storage device.

8 Claims, 4 Drawing Sheets

METHOD AND SYSTEM FOR ARCHIVING AND RETRIEVING A MARKUP LANGUAGE DOCUMENT

FIELD OF THE INVENTION

The invention relates to the field of data archiving, and in particular to a method and system for archiving and retrieving a markup language document.

BACKGROUND OF THE INVENTION

Markup languages, such as the Standard Generalized Markup Language (SGML), Extensible Markup Language (XML), HyperText Markup Language (HTML), etc., are used to define how data is formatted and classified in electronic documents. SGML is the international standard for defining descriptions of the structure of different types of electronic documents. SGML is very large, powerful, and complex. It has been in heavy industrial and commercial use for many years, and there is a significant body of expertise and software to go with it. XML is a lightweight cut-down version of SGML, which keeps enough of its functionality to make it useful but removes all the optional features which make SGML too complex to program for in a Web environment. XML was designed to meet the requirements of large scale web content providers by providing an industry-specific vendor-neutral data exchange. HTML is a small application of SGML used on the Web. HTML defines a very simple class of report-style documents, with section headings, paragraphs, lists, tables, and illustrations, with a few informational and presentational items, and some hypertext and multimedia.

Originally designed to meet the challenges of large-scale electronic publishing, XML is also playing an increasingly important role in the exchange of a wide variety of data on the Web and elsewhere. As organizations continue to adopt XML as a standard for representing documents and transferring data, there is an increasing demand for a safe, efficient and reliable method for archiving this data. However, due to the architecture of XML this data type cannot be archived in the way that conventional data is stored using standard document archival processes. The reason for this is that there are multiple external items/resources which must be associated with an XML document. In order to truly archive and retrieve an XML document and retain fidelity of the document, all of the resources which are referenced within the XML document must either be archived or made available indefinitely on the web server so they can be referenced by the XML document.

An XML document is made up of a plurality of tags. Tags define the syntax for describing one or more elements of data, for example, <day>Monday</day> or <customer name>IBM</customer name>, wherein <day> and <customer name> are the tags that define the type of data enclosed within a start < > tag and a finish </> tag and "Monday" and "IBM" are the data elements.

An example of an XML document (EXAMPLE 1) is presented below. Shown in italics and underlined are the resources that are required in order to format and display the content of the XML document correctly.

EXAMPLE 1

```
<?xml version="1.0" encoding="UTF-8" standalone="no"?>
<?xml-stylesheet type="text/css" href="song.css"?>
<!DOCTYPE SONG SYSTEM "expanded_song.dtd">
    <TITLE>Great song</TITLE>
    <PHOTO
        xlink:type="simple" xlink:show="onLoad"
        xlink:href="blogg.jpg"
        ALT="Blogg" WIDTH="100" HEIGHT="200"/>
    <COMPOSER>Bloggs </COMPOSER>
    <COMPOSER>Bloggs </COMPOSER>
    <PRODUCER>Bloggs </PRODUCER>
    <LENGTH>6:20</LENGTH>
    <YEAR>1995</YEAR>
    <ARTIST>The Blogg brothers </ARTIST>
</SONG>
```

In EXAMPLE 1, it can be seen that the XML document is not a stand alone document, but references other resources such as a style sheet (song.css), a data type definition file (expanded_song.dtd) and an image file (bloggjpg). If the bloggjpg image file, song.css style sheet, and expanded_song.dtd data type definition file are not archived along with the XML document, the archived XML document when viewed will not display correctly. This is because the references within the XML document, i.e., <?xml-stylesheet type="text/css" href="song.css"?>, <!DOCTYPE SONG SYSTEM "expanded_song.dtd"> and xlink:type="simple" xlink:show="on Load" xlink:href="blogg.jpg" cannot locate the referenced resources, i.e., song.css, expanded_song.dtd and bloggjpg, respectively. Hence, the fidelity of the XML document is lost.

One problem faced when trying to archive XML is that XML often references multiple resources (a resource may be an image, an audio file, a style sheet, a data type definition document, a data file, etc.) and hence, unlike conventional data which is "flat" in its structure, an XML document has a hierarchical structure. Therefore, in order to fully archive and retrieve the XML document and retain the fidelity of the data, each of the resources which are referenced within the XML document must either be archived or made available for an indefinite amount of time on a web server. If the aforementioned does not occur the XML document will not be displayed correctly because the XML document will be incomplete.

Existing prior art systems attempt to solve the above problem by treating a XML document as a collection of XML tags rather than analyzing the individual XML tags and referenced resources in the XML document. A disadvantage of this approach is that for every XML document, a plurality of resources may be referenced. As the number of XML documents increase, so do the number of referenced resources which are required to be stored. This in turn creates duplication of resources and increases the amount of data storage required.

Another solution that vendors are adopting is an "XML enabling relational database" approach. Unfortunately, if hierarchical documents, such as XML documents, are placed into a relational database, the relational database forces the XML document into a structure that is not compatible with the XML itself. To overcome this problem, a relational database is configured with external conversion layers that mimic XML storage by translating it between XML and another data format. This conversion is error-prone and results in a great deal of processing overhead, particularly with increasing transaction rates and XML document complexity. This approach does not provide the cross-referencing and linking to resources such as style sheets and images, which are essential to maintaining the integrity and fidelity of an XML document.

Another disadvantage with known solutions is that XML is viewed from the perspective of a data representation format rather than a document or content representation format. This means that vendors of known solutions are required to re-engineer the data models of their relational databases such that the complex multi-part and hierarchical structure of the XML document may be supported.

Therefore, there is a need to provide a method and system for archiving and retrieving a markup document such that the fidelity and integrity of the document is not lost.

SUMMARY OF THE INVENTION

A first aspect of the present invention is directed to a method for archiving a markup language document comprising at least one referenced resource and a storage device for storing at least one referenced resource, the method comprising the steps of: identifying at least one referenced resource in the document; determining if the at least one identified referenced resource is stored in the storage device; and in response to an unsuccessful determining step, storing the at least one identified referenced resource in the storage device.

The invention provides the ability to archive an XML document in such a way that the XML data can be retrieved and displayed with full fidelity. By archiving not only the XML document, but also the resources which are referenced within one or more XML tags, i.e., a style sheet, a data type definition file and/or an image, etc., the fidelity of the XML document can be maintained.

In accordance with the present invention, the resources are identified by parsing the individual XML tags that are contained within an XML document. The parser locates one or more "href" tags to identify one or more referenced resources that are required for the XML document to be displayed correctly. Once the referenced resources are located, a check is performed to determine whether each referenced resource already exists in a storage device. If the referenced resource already exists in the storage device, then the referenced resource is not stored for a second time as this would create duplication of content and increase storage requirements. This in turn keeps storage requirements to a minimum.

A further advantage of the present invention is that the structure and resources required to interpret an XML document are contained within the XML tags of the XML document and therefore do not need to be reproduced by a database structure. The XML tags are parsed to identify one or more referenced resources which are required to interpret and display the XML document, enabling the data model of the invention to be very simple.

A second aspect of the present invention is directed to a method for retrieving an archived markup language document from a storage device, the method comprising the steps of: receiving a search request to retrieve an archived document from the storage device; identifying one or more referenced resources within the requested archived document; determining if the one or more referenced resources are stored in the storage device; and retrieving the requested archived document and the one or more referenced resources from the storage device.

Advantageously, a requested XML document can be loaded onto a plurality of client devices with a faster response time, because a check is performed to determine if the requested resource has already been loaded into a document cache. If the requested resource is already located in the document cache, it then becomes available to a plurality of client devices, enabling a requested resource to be retrieved only once for any given number of client devices. Any recently retrieved resource is cached onto a server for enhanced performance capabilities. A third aspect of the present invention is directed to a system for archiving a markup language document, the system comprising: an XML indexer for parsing the document to identify one or more referenced resources; and a storage device for storing at least the document and the each referenced resource in a storage device.

A fourth aspect of the present invention is directed to a system for retrieving an archived markup language document, comprising: a system for receiving a request for an archived document; an XML retriever for determining at least one referenced resource in the document, and a load component for loading the document and the at least one referenced resource from a storage device.

A fifth aspect of the present invention provides a computer program product directly loadable into the internal memory of a digital computer, comprising software code portions for performing, when said product is run on a computer, the methods as described above.

BRIEF DESCRIPTION OF THE DRAWINGS

Embodiments of the present invention will now be described, by way of examples only, with reference to the accompanying drawings in which.

DETAILED DESCRIPTION OF THE INVENTION

Figure 1:
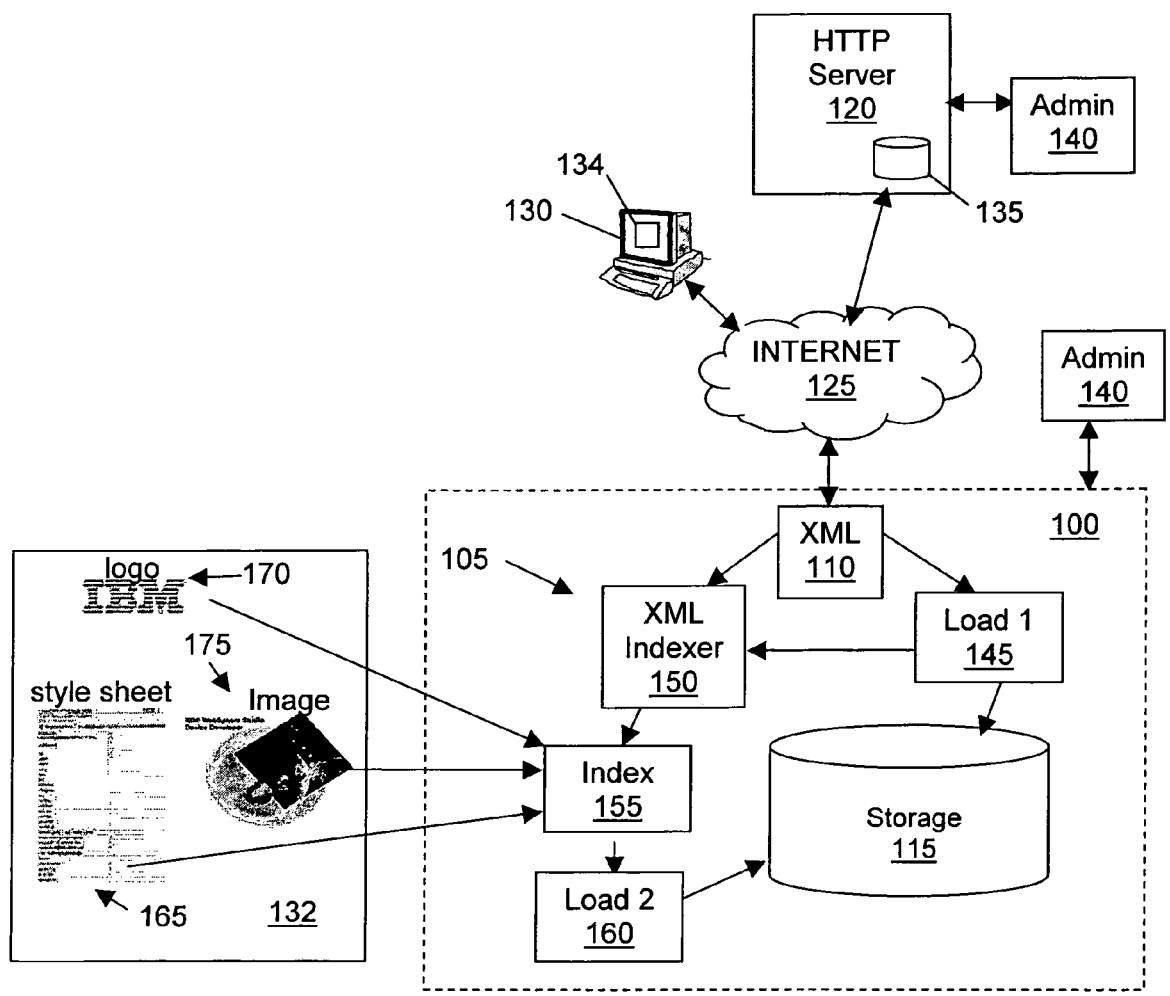
FIG. 1 is a schematic overview of an XML document archiving system in accordance with the present invention.

Referring to FIG. 1, a server 100 including an archiving system 105 for archiving an XML document 110 onto a storage device 115 in accordance with the present invention is illustrated. The XML document 110 may be provided via any now known or later developed device/source capable of producing/providing an XML document. For example, in this embodiment, the XML document 110 is provided by an HTTP server 120 over the Internet 125 for display on a client device 130 (e.g., using a browser 134). The client device 130 may comprise a computer, a server, a PDA, a pager, a mobile phone, etc. Although shown as comprising separate systems, it should be noted that the server 100 may be included as part of the HTTP server 120.

An exemplary displayed web page 132 corresponding to the XML document 110 is also shown in FIG. 1. The resources called by the XML document 110 are stored by the HTTP server 120 in a storage device 135. The storage device 135 may comprise magnetic media, optical media, random access memory (RAM), etc., and may reside at a single physical location, comprising one or more types of data storage, or may be distributed across a plurality of physical systems in various forms.

Upon request of the client device 130 or an administrator 140, the XML document 110 is provided to the server 100 for archiving by the archiving system 105. The request may comprise a manual and/or automatic request (e.g., a timed backup). The administrator 140 may be associated with, or have access to, the HTTP server 120, server 100, and/or client device 130. For example, a request may be sent from the client device 130 over a network such as the Internet 125 to the HTTP server 120 to load a requested XML document 110 into the browser 134 running on the client device 130. The client device 130 sends a further request to the HTTP server 120 requesting that the loaded XML document 110 is to be archived. The HTTP server 120 then sends a request to the server 100 to archive the XML document 110. If the request is granted, the XML document 110 and its associated resources are provided to the server 100 for archiving by the archiving system 105.

The archiving system 105 includes a first load system 145 for loading the XML document 110 onto the storage device 115 in a standard load process. As with the storage device 135, the storage device 115 may comprise magnetic media, optical media, random access memory (RAM), etc., and may reside at a single physical location, comprising one or more types of data storage, or may be distributed across a plurality of physical systems in various forms.

As the standard load process is being executed by the first load system 145, an XML indexer 150 (e.g., in the form of a JAVA servlet) is called for parsing the XML document 110 based on the individual XML tags that are contained within the XML document 110. In particular, as shown in FIG. 1, the XML indexer 150 is configured to extract references to resources in the XML document 110, and to place these references into an index file 155. The resources identified by the XML indexer program 150 are subsequently stored in the storage device 115 in a second load process 160. The references to the resources (e.g., style sheet 165, logo 170, and image file 175 displayed in web page 132) in the index file 155 comprise the full path names and file names of the resources as referenced in the XML document 110.

The archiving system 105 enables the XML document 110 and the resources (e.g., style sheet 165, logo 170, and image file 175) to be archived onto the storage device 115 as defined by a set of rules set up by the administrator 140 of the system. The archiving system 105 manages the retention of the XML document 110 and its associated resources on the storage device 115 for an extended period of time, and allows the XML document 110 to be retrieved and displayed correctly in full fidelity at a later date.

Each XML tag in the XML document 110 defines a resource that needs to be archived along with XML document 110, if the XML document 110 is to be displayed in full fidelity. For example, referring to EXAMPLE 2 below, the XML document 110 comprises a plurality of XML tags (e.g., 'href'), wherein each tag defines a resource, such as customer name, account number, customer address, and invoice amount. In the present invention, each resource extracted from the XML document 110 is stored in the storage device 115, and indexed in an index file 155, such that the data can later be retrieved with ease, for example by customer name.

EXAMPLE 2

```
<?xml version="1.0" encoding="UTF-8" standalone="no"?>
<?xml-stylesheet type="text/css" href="invoice.css"?>
<!DOCTYPE Invoice "expanded_invoice.dtd">
    <TITLE>Customer Invoice</TITLE>
    <PHOTO
        xlink:type="simple" xlink:show="onLoad"
        xlink:href="company_logo.jpg"
        ALT="Customer invoice for services supplied" WIDTH="100"
        HEIGHT="200"/>
    <Customer account number>012345</Customer account number>
    <Customer name>Martin Pepper</Customer name>
    <Address1>64 Merrington Avenue</Address>
    <Address2>Winchester</Address2>
    <Invoice amount>£980</Invoice amount>
    </Invoice>
```

A resource stamp may be added to the XML document 110 by the XML indexer 150, for example, resource1/docs/stylesheets/song.css size 38 KB created Oct. 3, 2003. Adding this additional reference enables version control of the resources. To this extent, when a resource is retrieved from the storage device 115, a check can be performed to determine whether, for example, a company is using a new logo on their invoice. A comparison is made between the resource attributes of the old logo and an updated version. If any of the attributes have changed, i.e., the size of the resource and/or the date, the system can determine that a new version is to be used.

Figure 2:
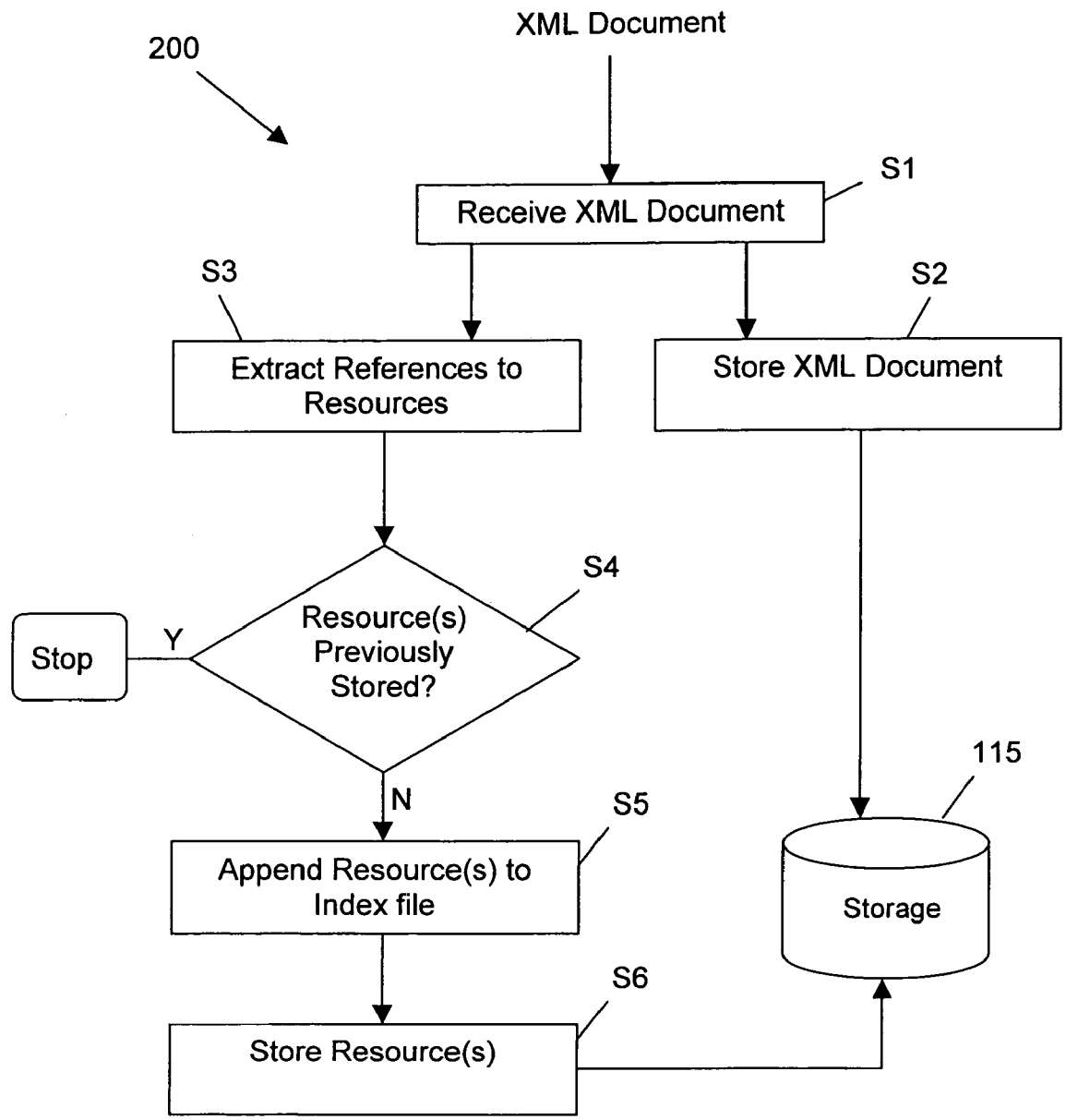
FIG. 2 is a flow diagram detailing the operational steps of the archiving process of an XML document in accordance with the present invention

A flow diagram 200 detailing the operational steps of the archiving process of an XML document 110 in accordance with the present invention is illustrated in FIG. 2. In step S1, an XML document 110 is received by the server 100. In step S2, the XML document 110 is stored in the storage device 115. The XML document 110 is also provided to the XML indexer 150, which extracts references to the external resources in the XML document 110 (step S3). In step S4, the XML indexer 150 performs a query to determine whether any of the extracted resources have previously been stored in the storage device 115. In particular, after the references to the resources have been extracted from the XML document 110 by the XML indexer 150, the XML indexer 150 examines the index file 155 to determine whether a reference to any of the extracted resources has previously been appended to the index file 155, indicating that that resource has already been stored in the storage device 115. If a reference to an extracted resource is not found in the index file 155, a reference to the resource is added to the index file 155 (step S5) and the resource is stored (step S6) in the storage device 115 by the second load process 160. If a reference to an extracted resource is found in the index file 155, the resource is not stored a second time in the storage device 115. This process is repeated for each extracted resource in the XML document 110.

One feature of this process is that the XML indexer 150 determines, before storage of a resource (e.g., an image, logo, style sheet, and/or data type definition document, etc.) in the storage device 115, that the resource has not already been stored in the storage device 115. If a resource is already referenced in the index file 155, indicating that the resource has already been stored in the storage device 115, the resource is not stored again in the storage device 115. If, on the other hand, a resource is not yet referenced in the index file 155, indicating that the resource has not yet been stored in the storage device 115, a reference to the resource is added to the index file 155 and the resource is stored in the storage device 115 by the second load process 160. This process accelerates the storage process by preventing duplicative storage of the same resource, and also dramatically saves on storage space as each resource is only stored once in the storage device 115. This can be further explained by reference to EXAMPLE 3 below.

EXAMPLE 3

An organization maintains all of its invoices in an XML data format. The organization produces 10,000 invoices on a daily basis. Each XML document 110 (referred to in this example as XML invoice 110) has the same layout, and only the data elements such as customer name, total amounts, dates, etc., are different. Each of the invoices has three identical resources; a logo, a style sheet and an image. Such an invoice 132, including resources 165 (style sheet), 170 (logo), and 175 (image), is shown in FIG. 1.

As the first XML invoice 110 (FIG. 1) is loaded (step S2, FIG. 2) into the storage device 115 by the first load process 145, the XML indexer 150 is launched and extracts (step S3) references to the resources 165, 170, 175 in the XML invoice 110 and performs a check (step S4) to determine whether any of the referenced resources 165, 170, 175 have previously been stored in the storage device 115. In this example it is found that the resources 165, 170, 175 referenced in the first XML invoice 110 have not been previously stored in the storage device 115. As such, the full path name and file name of the resources 165, 170, 175 are placed into the index file 155 (step S5), and the references 165, 170, 175 are loaded (step S6) onto the storage device 115 by the second load process 160.

A second XML invoice 110, which references the same resources 165, 170, 175 as the first XML invoice 110, is subsequently loaded (step S1) onto the storage device 115. As the second XML invoice 110 is being loaded, the XML indexer 150 parses (step S3) the second XML invoice 110 for references to external resources, and examines the index file 155 (step S4) to determine whether the resources have already been stored in the storage device 115. In this instance, since the resources 165, 170, 175 referenced in the second XML invoice 110 are the same as those referenced in the first XML invoice 110 and previously stored in the storage device 115, the XML indexer 155 does not add a second reference to these references to the index file 155 and does not store the resources 165, 170, 175 a second time in the storage device 115.

The above process is repeated for each of the remaining 9,998 XML invoices 110. Thus, after 10,000 invoices have been processed and archived, only three resources (i.e., style sheet 165, logo 170, and image 175) have been loaded onto the storage device 115. That is, instead of saving each resource 165, 170, 175 10,000 times in the storage device 115, only a single instance of each resource 165, 170, 175 is stored.

Figure 3:
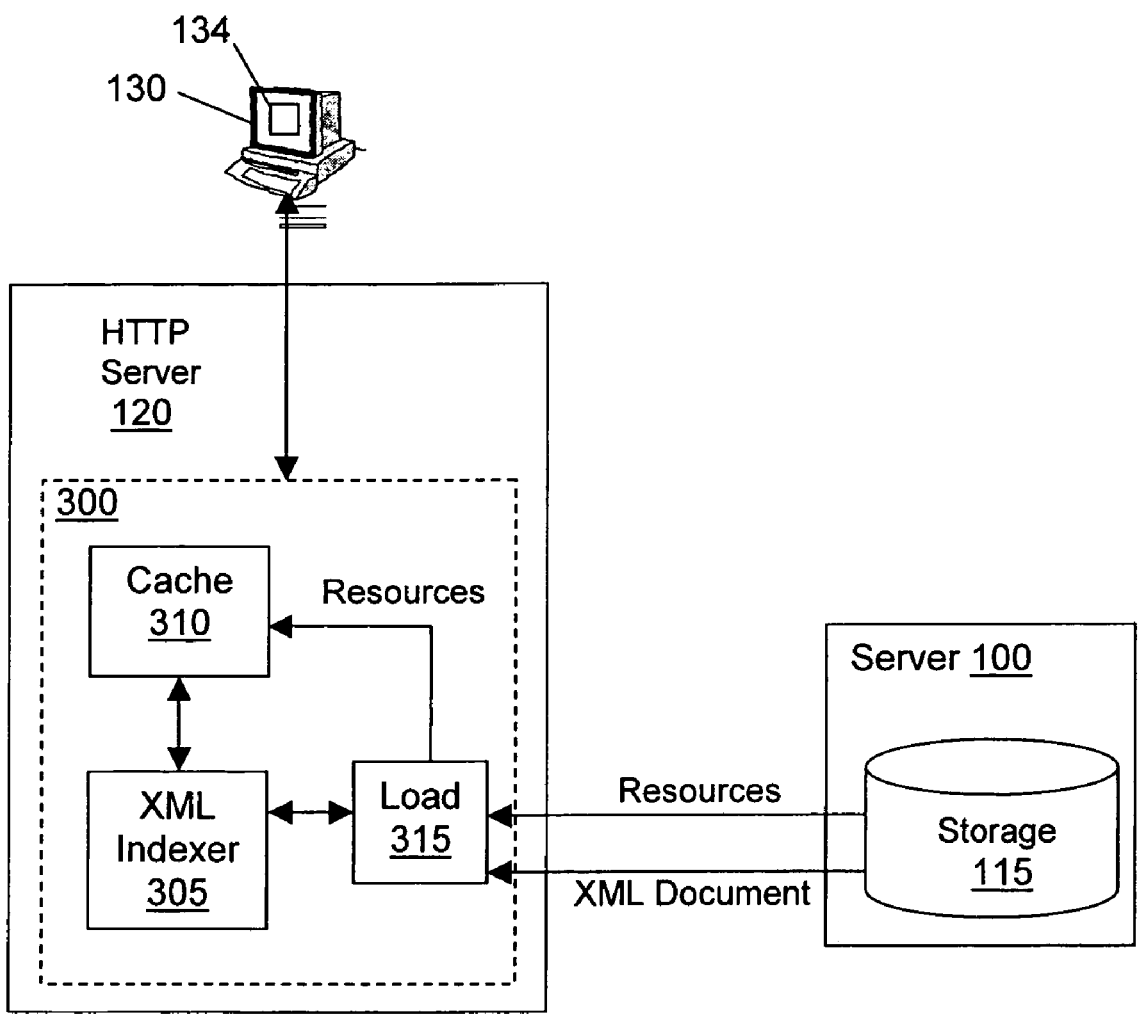
FIG. 3 is a schematic overview of an XML document retrieval system in accordance with the present invention.

A schematic overview of an XML document retrieving process in accordance with the present invention is illustrated in FIG. 3.

In FIG. 3, a user performs a search for a particular document using, for example, a browser 134 running on client device 130. A search hit list is displayed in the browser 134, and the user clicks on a document to be retrieved from the HTTP server 120 and displayed on the client device 130. Since the requested document corresponds to an XML document 110 archived on the storage device 115 on the server 100, the HTTP server 120 must retrieve the XML document 110 and the resources referenced by the XML document 110 from the storage device 115, prior to sending the requested document to the client device 120.

Initially, the XML document 110 is retrieved by a load process 315 on the HTTP server 120 from the storage device 115 and provided to a retrieval system 300, which includes an XML indexer 305. Similar to the XML indexer 155 shown in FIG. 1, the XML indexer 305 is configured to parse the retrieved XML document 110 based on the individual XML tags (e.g., "href") contained within the retrieved XML document 110, and to identify the resources associated with the XML tags. The XML indexer 305 may be provided, for example, as a JAVA servlet or in any other suitable form. The load process 315 is also configured to retrieve the resources referenced by the XML document 110 and to place the resources in the same location (e.g., in the storage device 135 in the HTTP server 120) that is referenced by the XML document 110. This enables the XML document 110 to find the referenced resources without having to be edited or altered in any way. Although described as being located in the HTTP server 120, the retrieval system 300 may be located on the server 100, or other location accessible to the HTTP server 120.

A cache 310 is provided to store resources recently retrieved from the storage device 115. The retrieved resources are temporarily stored in the cache 310 for a predetermined amount of time. Prior to retrieving any resources referenced by an XML document 110 from the storage device 115, the XML indexer 305 examines the cache 310 to determine if the resources have recently been retrieved. If a resource referenced by the XML document 110 is available in the cache 310, that resource is not retrieved from the storage device 115, but is accessed directly from the cache 310. If a resource referenced by the XML document 110 is not available in the cache 310 (e.g., the resource was not previously retrieved from the storage device 115 or the resource expired from the cache 310, etc.), that resource is retrieved from the storage device 115 and stored in the cache 310. The XML document 110 and the retrieved resources referenced by the XML document 110 are subsequently sent to the client device 130 by the HTTP server 120 for display. The use of the cache 310 increases the performance of the retrieval system 300 (e.g., the XML document 110 and associated resources are provided much more quickly to the client device 130).

Figure 4:
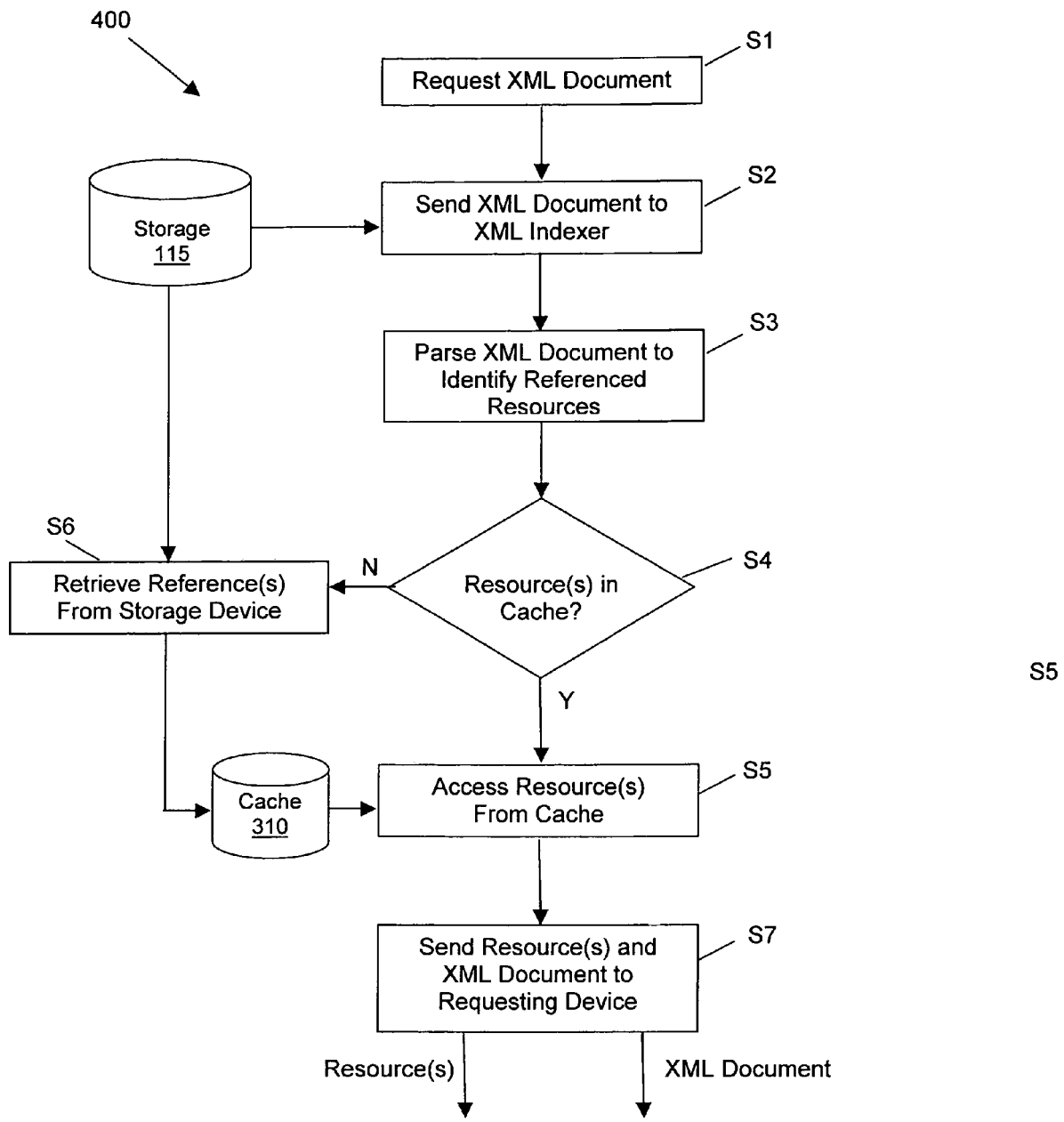
FIG. 4 is a flow diagram detailing the operational steps of the retrieval process of an XML document in accordance with the present invention.

A flow diagram 400 detailing the operational steps of the process for retrieving an XML document 110 in accordance with the present invention is illustrated in FIG. 4.

In step S1, an XML document 110 is requested, for example, in a search. In step S2, the requested XML document 110 is accessed from the storage device 115 and sent by the server 100 to the XML indexer 305 of the retrieval system 300. The XML indexer 305 is configured to parse (step S3) the retrieved XML document 110 based on the individual XML tags (e.g., "href") contained within the retrieved XML document 110, and to identify the resources associated with the XML tags (e.g., the resources 165 (style sheet), 170 (logo), and 175 (image), illustrated in FIG. 1).

Prior to the retrieval of any resources referenced by an XML document 110 from the storage device 115, the XML indexer 305 examines (step S4) the cache 310 to determine if any of the referenced are stored in the cache 310. If a resource referenced by the XML document 110 is available in the cache 310, that resource is not retrieved from the storage device 115, but is accessed (step S5) directly from the cache 310. If a resource referenced by the XML document 110 is not available in the cache 310, that resource is retrieved (step S6) from the storage device 115, stored in the cache 310, and accessed. The XML document 110 and the retrieved resources referenced by the XML document 110 are subsequently sent (step S7) to the client device 130 by the HTTP server 120 for display.

This process can be further explained by reference to EXAMPLE 4 below.

EXAMPLE 4

Using the same scenario as in EXAMPLE 3, a first user carries out a search for an invoice using the browser 134 running on client device 130. The user locates the desired invoice in the search results and clicks on the invoice to be displayed (step S1, FIG. 4). The XML invoice 110 corresponding to the requested invoice is retrieved from the storage device 115 and sent (step S2) to the XML indexer 305. The XML indexer 305 parses (step S3) the XML invoice 110 to identify the resources referenced by the XML invoice 110.

In step S4, the cache 310 is checked and the resources that are available in the cache 310 are accessed (step S5). If any of the referenced resources are not in the cache 310, those resources are retrieved (step S6) from the storage device 115, stored in the cache 310, and accessed (step S5). The XML document 110 and the resources referenced in the XML document 110 are then sent (step S7) to the client device 130, and the invoice is displayed.

A second user (who may be in a different building or a different country to the first user) performs a search for the same type, but different invoice (e.g., an invoice comprising the same style sheet 165, logo 170, and image 175, but different customer name, total amounts, dates, etc.). The XML invoice 110 corresponding to the requested invoice is retrieved from the storage device 115 and sent to the XML indexer 305, which parses the XML invoice 110 to identify the resources referenced by the XML invoice 110. The cache 310 is then checked to see if any of the referenced resources are stored in the cache 310. In this case, all of the referenced resources are located in the cache 310. The cached resources are then sent along with the XML invoice 110 to the client device 130 for immediate display. If there are 10,000 XML invoices 110 as described in EXAMPLE 3 above, and each of the remaining 9,998 XML invoices are retrieved in turn from the storage device 115 for display, the resources (e.g., style sheet 165, logo 170, and image 175) do not have to be retrieved again from the storage device 115 because the resources are immediately available in the cache 310.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

The invention claimed is:

1. A method for archiving a markup language document comprising at least one referenced resource and a storage device for storing at least one referenced resource, the method comprising the steps of:
   storing the markup language document in the storage device;
   providing the markup language document to an indexer for identifying at least one referenced resource in the markup language document;
   determining, by examining with the indexer an index file containing references to previously identified and stored resources, if the at least one identified referenced resource is stored in the storage device;
   in response to an unsuccessful determining step, adding a reference to the at least one identified referenced resource to the index file and storing the at least one identified referenced resource in the storage device; and
   in response to a successful determining step, not storing the at least one identified referenced resource in the storage device for a second time.

2. The method of claim 1, wherein the indexer is configured to identify the at least one referenced resource in the markup language document by:
   parsing at least one tag contained within the markup language document, wherein each tag corresponds to a referenced resource.

3. The method of claim 1, wherein the step of determining comprises:
   performing a query on the storage device to determine a match between each identified referenced resource in the markup language document and the referenced resources stored in the storage device.

4. The method of claim 3, wherein, if a match is found, the identified referenced resource is not stored again in the storage device.

5. The method of claim 1, wherein one version of a referenced resource is stored in the storage device.

6. The method of claim 1, wherein an identified referenced resource is selected from the group consisting of a style sheet, a data type definition file, and an image.

7. The method of claim 1, wherein the markup language document comprises an extensible markup language (XML) document.

8. A computer program product directly loadable into the internal memory of a digital computer, comprising software code portions for performing, when said product is run on a computer, a method for archiving a markup language document comprising at least one referenced resource, comprising:
   storing the markup language document in a storage device;
   providing the markup language document to an indexer for identifying at least one referenced resource in the document;
   determining, by examining with the indexer an index file containing references to previously identified and stored resources, if the at least one identified referenced resource is stored in the storage device;
   in response to an unsuccessful determining step, adding a reference to the at least one identified referenced resource to the index file and storing the at least one identified referenced resource in the storage device; and
   in response to a successful determining step, not storing the at least one identified referenced resource in the storage device for a second time.

* * * * *